Figure 1:
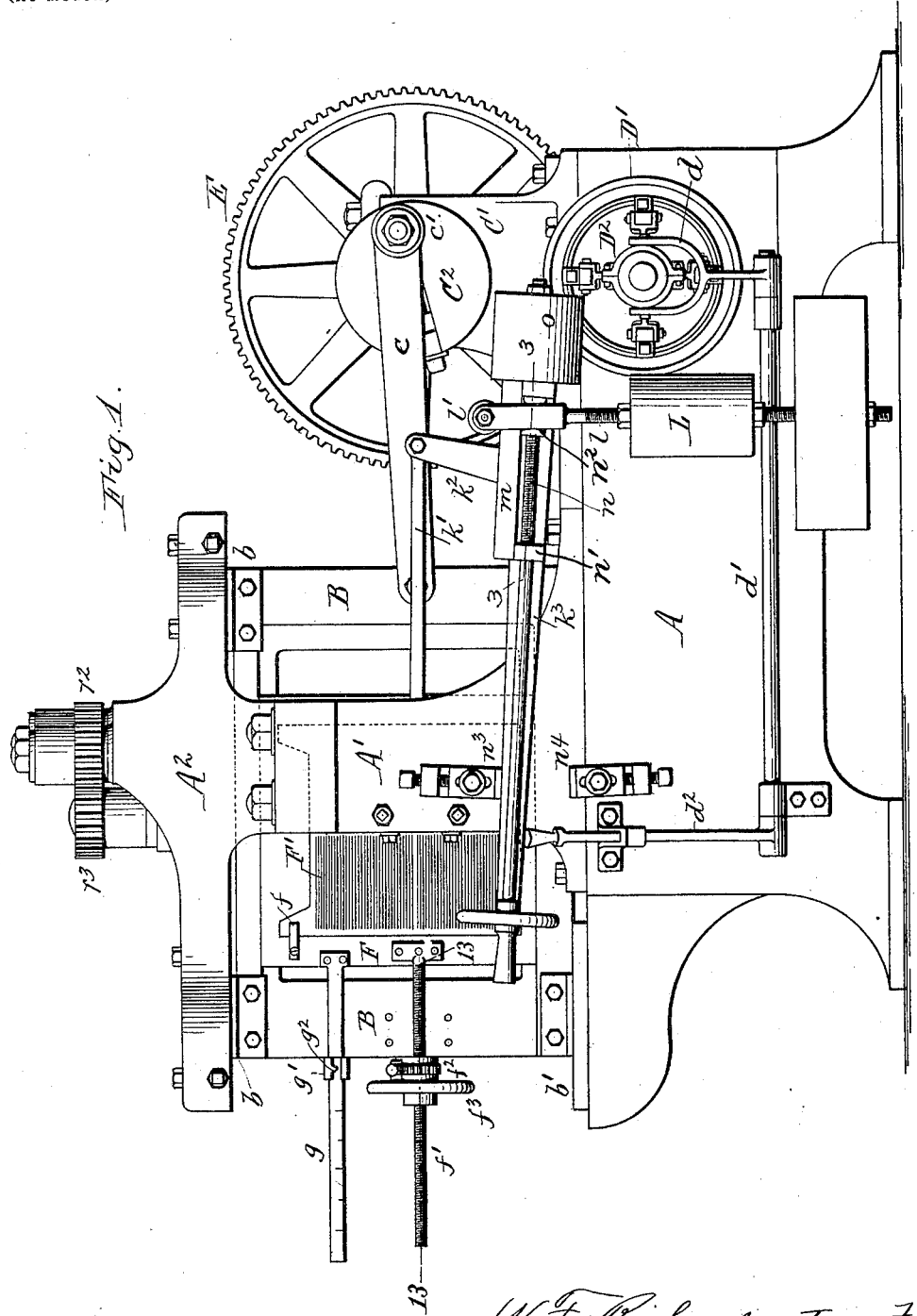

No. 699,814. Patented May 13, 1902.
W. F. RICHARDS.
MACHINE FOR MAKING BATTERY GRIDS.
(Application filed Oct. 5, 1900.)
(No Model.) 5 Sheets—Sheet 1.

Witnesses:
E. A. Volk.
F. F. Schuzinger.

W. F. Richards Inventor.
By Wilhelm Bonner
Attorneys.

No. 699,814. Patented May 13, 1902.
W. F. RICHARDS.
MACHINE FOR MAKING BATTERY GRIDS.
(Application filed Oct. 5, 1900.)
(No Model.) 5 Sheets—Sheet 2.
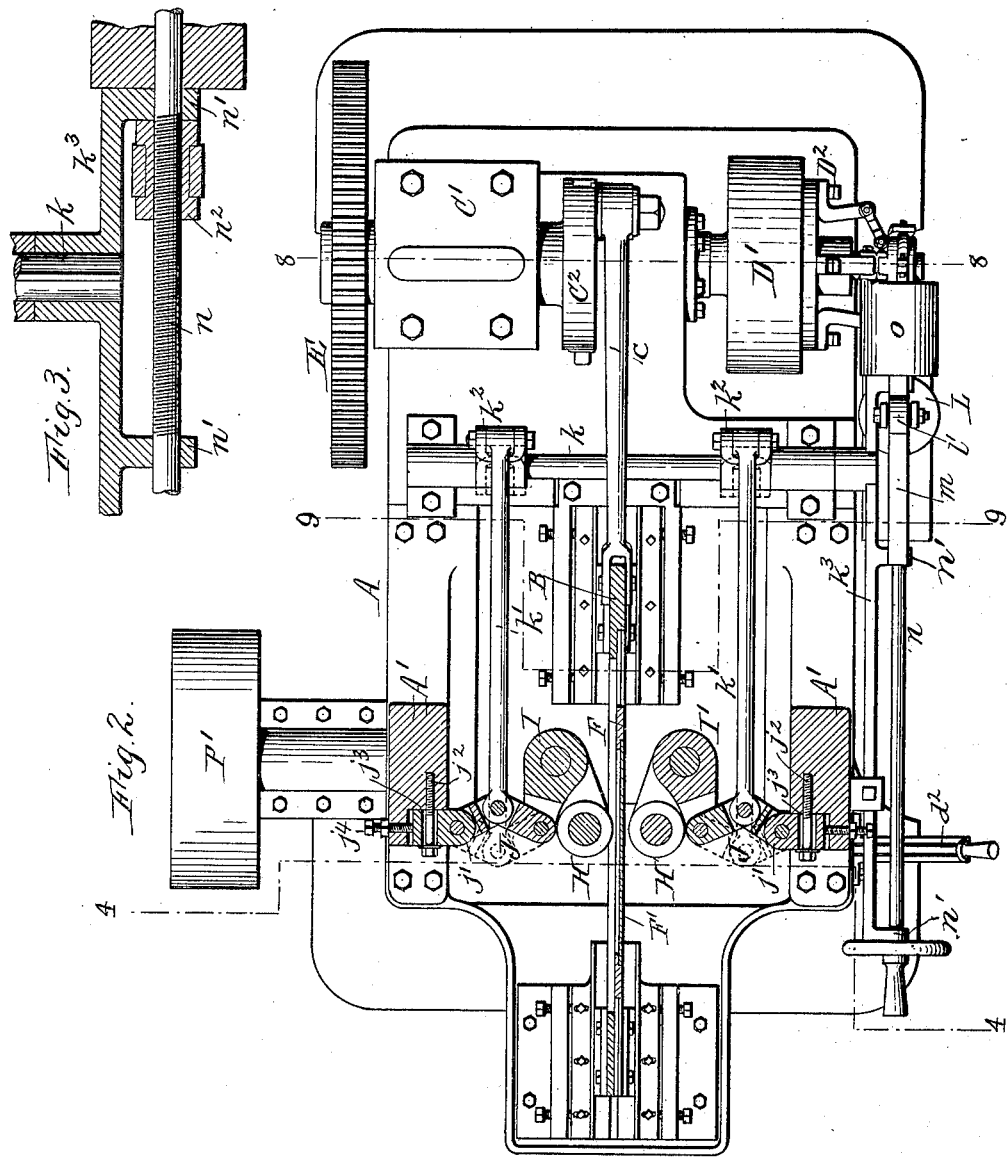

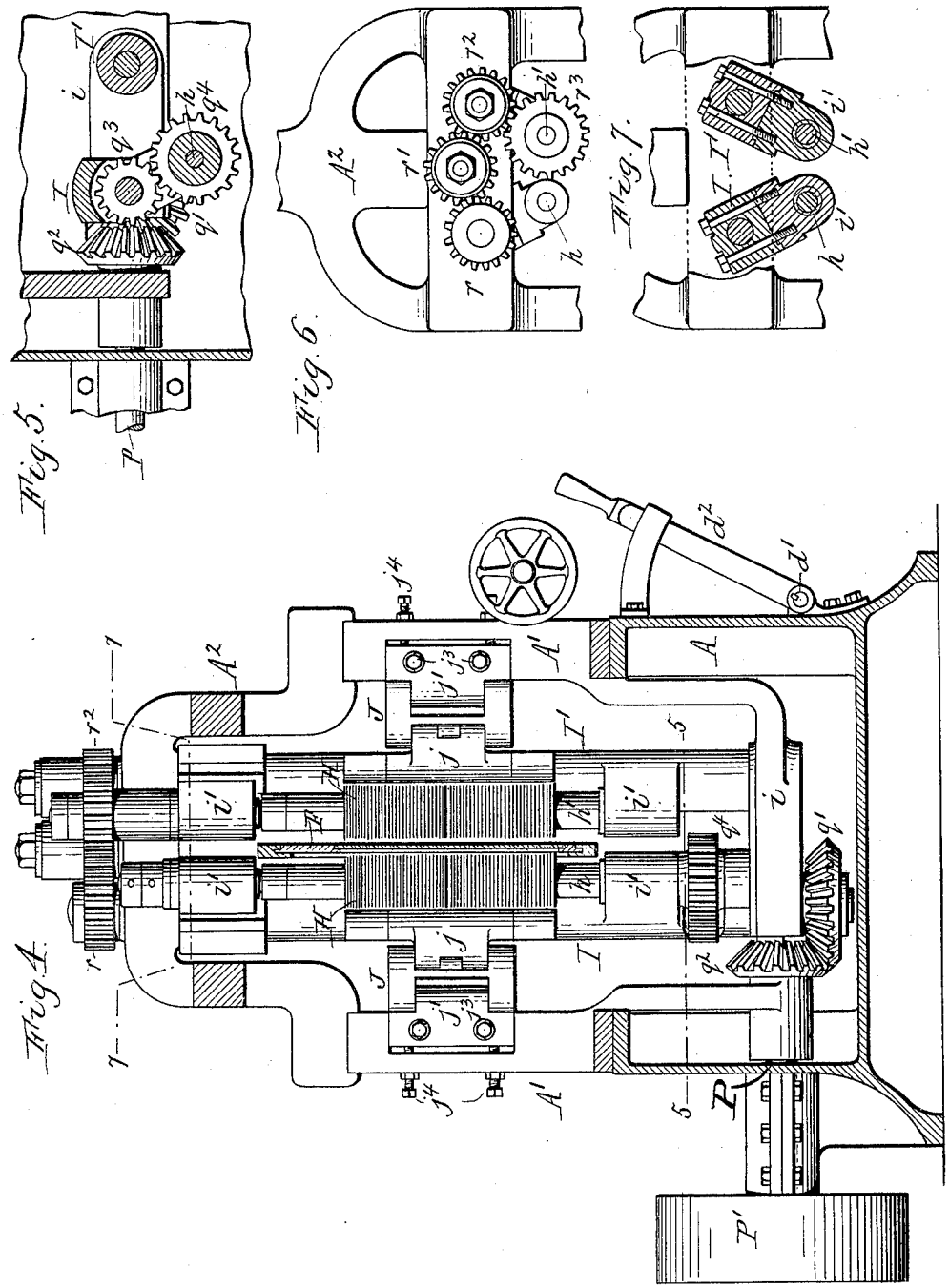

No. 699,814. Patented May 13, 1902.
W. F. RICHARDS.
MACHINE FOR MAKING BATTERY GRIDS.
(Application filed Oct. 5, 1900.)
(No Model.) 5 Sheets—Sheet 4.
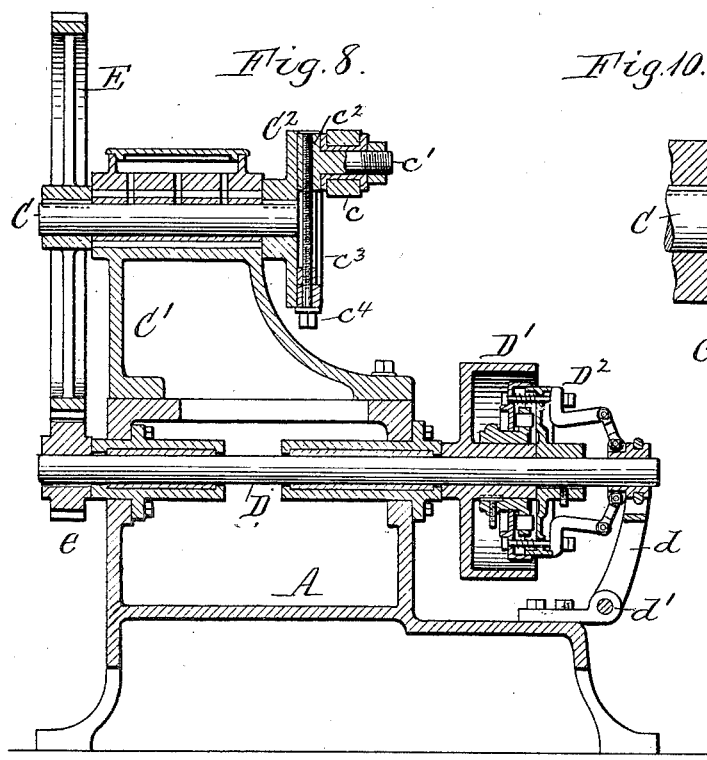
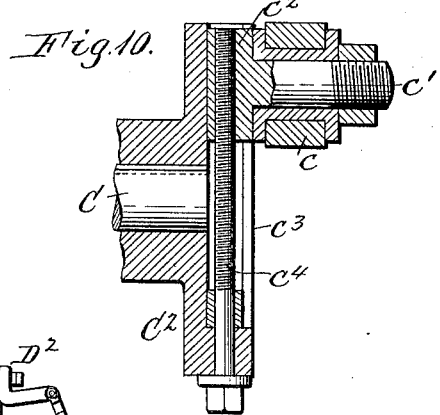
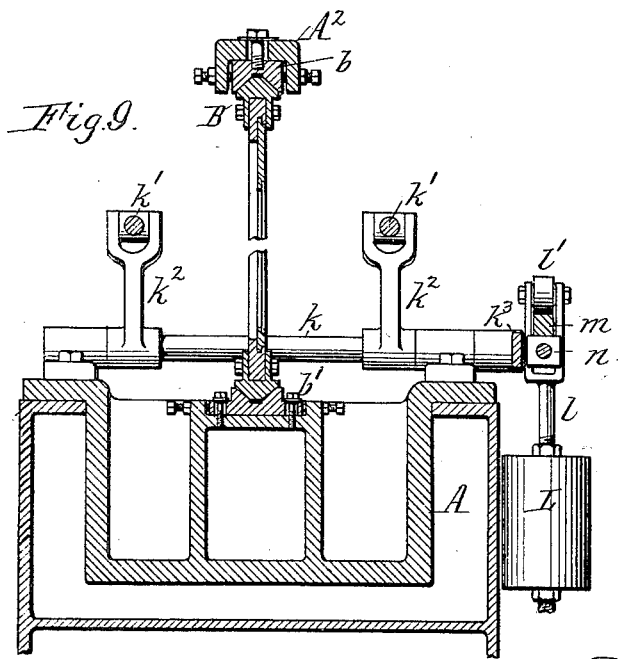
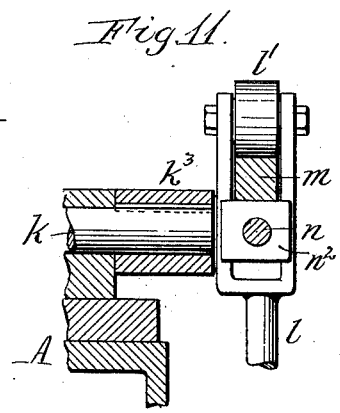
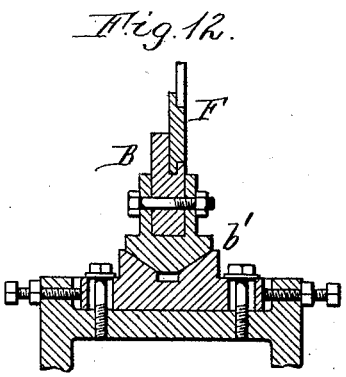
Witnesses:
E. A. Volk.
F. F. Schuzinger.
W. F. Richards, Inventor.
By Wilhelm Bonner
Attorneys.
THE NORRIS PETERS CO., PHOTO-LITHO., WASHINGTON, D. C.

No. 699,814. Patented May 13, 1902.
W. F. RICHARDS.
MACHINE FOR MAKING BATTERY GRIDS.
(Application filed Oct. 5, 1900.)
(No Model.) 5 Sheets—Sheet 5.
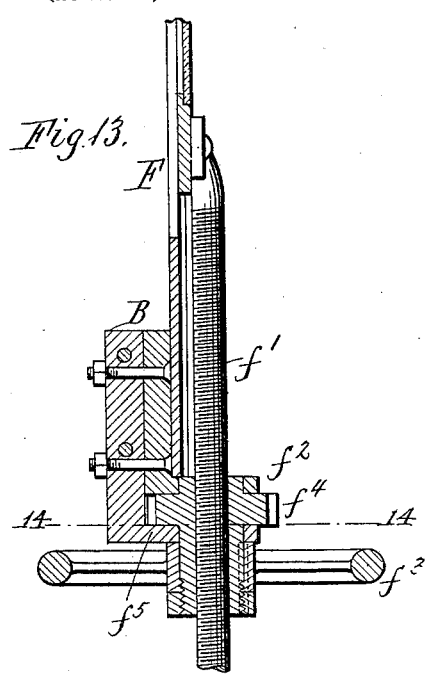
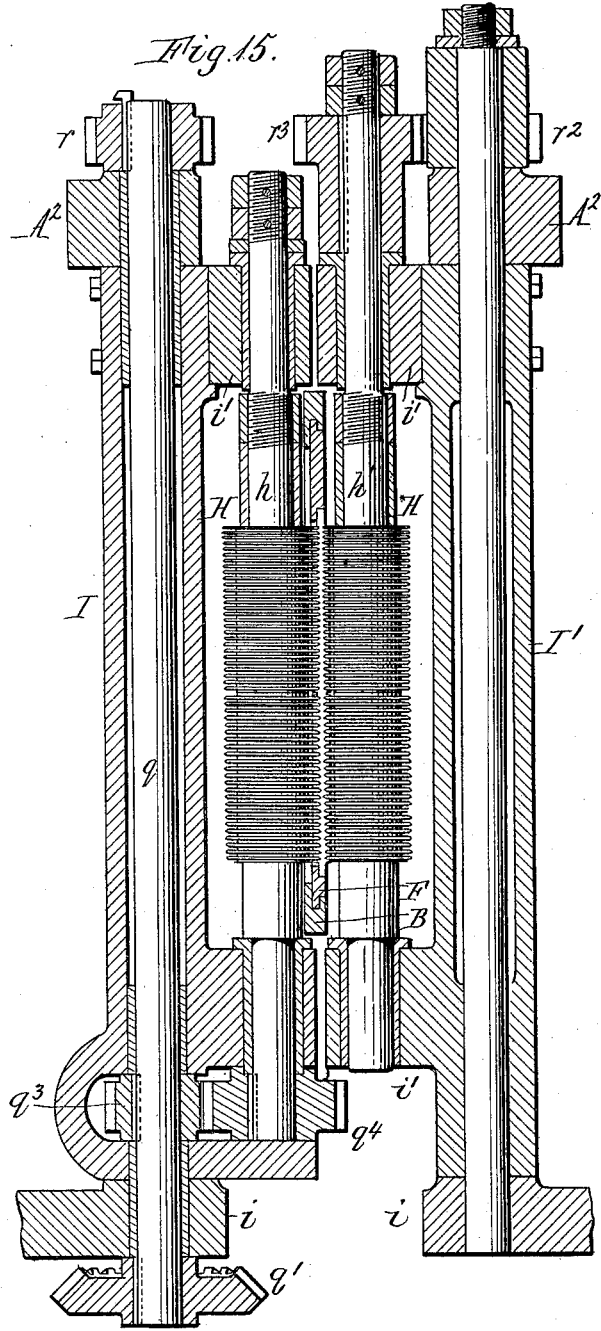
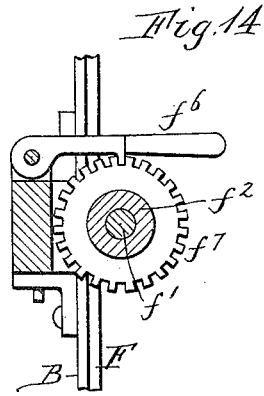
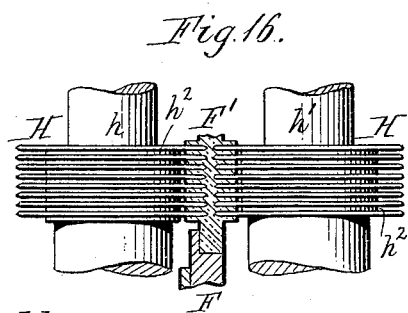
Witnesses:
E. A. Volk.
F. F. Schuyinger
W. F. Richards Inventor.
By Wilhelm Bonner
Attorneys.
THE NORRIS PETERS CO., PHOTO-LITHO., WASHINGTON, D. C.

UNITED STATES PATENT OFFICE.

WILLARD F. RICHARDS, OF BUFFALO, NEW YORK, ASSIGNOR TO GOULD STORAGE BATTERY COMPANY, OF NEW YORK, N. Y., A CORPORATION OF WEST VIRGINIA.

MACHINE FOR MAKING BATTERY-GRIDS.

SPECIFICATION forming part of Letters Patent No. 699,814, dated May 13, 1902.

Application filed October 5, 1900. Serial No. 32,177. (No model.)

*To all whom it may concern:*

Be it known that I, WILLARD F. RICHARDS, a citizen of the United States, and a resident of Buffalo, in the county of Erie and State of New York, have invented new and useful Improvements in Machines for Making Battery-Grids, of which the following is a specification.

This invention relates to a machine for making that type of secondary-battery plates or grids which are provided with numerous parallel ribs or leaves between which the active material is deposited or arranged and which are spun on the lead plate or blank by reciprocating the same between a pair of spinning-rollers composed of numerous thin disks which penetrate the blank and displace the metal in such a manner as to raise the ribs or leaves on the same. Such a battery-plate and a machine for spinning the same are shown and described in Letters Patent of the United States, No. 572,363, granted December 1, 1896, to A. F. Madden. Heretofore it has been the practice to spin these plates in a horizontal position between horizontally-arranged spinning-rollers, as shown, for instance, in the Letters Patent above referred to. While such a horizontal machine is suitable for spinning small battery-plates, it is unsatisfactory for large plates, because the plates are liable to sag, especially when comparatively thin, and when this occurs the disks do not spin the ribs of uniform depth throughout their length, but penetrate the plate to a greater depth in some places than in others. When a plate is spun unevenly, the same is liable to warp or buckle.

The object of my invention is the provision of an efficient spinning-machine which is so organized that the lead plate or blank is spun in an upright or substantially upright position, thereby rendering it impossible for the plate to sag and insuring a uniform spinning of the same.

In the accompanying drawings, consisting of five sheets, Figure 1 is a side elevation of my improved spinning-machine. Fig. 2 is a sectional top plan view thereof. Fig. 3 is a fragmentary section in line 3 3, Fig. 1, on an enlarged scale. Fig. 4 is a transverse vertical section of the machine in line 4 4, Fig. 2. Fig. 5 is a horizontal section in line 5 5, Fig. 4. Fig. 6 is a fragmentary top plan view of the machine, showing the driving-gear of the spinning-rollers. Fig. 7 is a horizontal section in line 7 7, Fig. 4. Fig. 8 is a transverse vertical section of the machine in line 8 8, Fig. 2, the wrist-pin being shown at the top of the disk. Fig. 9 is a transverse section in line 9 9, Fig. 2. Fig. 10 is an enlarged transverse section of the crank-disk. Fig. 11 is a transverse section, on an enlarged scale, of the guide-rail of the adjustable pressure-weight and the lever which carries said rail. Fig. 12 is an enlarged cross-section of the lower guide of the reciprocating frame which carries the battery-grid and its holder. Fig. 13 is an enlarged horizontal section of the adjusting devices of said holder in line 13 13, Fig. 1. Fig. 14 is a transverse section in line 14 14, Fig. 13. Fig. 15 is a vertical section, on an enlarged scale, of the rock shafts or frames which carry the spinning-rollers. Fig. 16 is a fragmentary sectional elevation of the spinning-rollers and a battery-grid, showing the action of the spinning-disks.

Like letters of reference refer to like parts in the several figures.

A is the stationary main frame of the machine, which is substantially rectangular in form.

A' A' are standards rising from the front portion of the main frame and arranged at opposite sides thereof, and A² is a horizontal yoke or top frame surmounting said standards and rigidly secured to the upper ends thereof.

B is an upright reciprocating head or frame arranged lengthwise of the machine and located centrally between the standards A'. This frame is guided in longitudinal upper and lower ways b b', arranged on the main frame A and on the under side of the top frame A², as shown in Figs. 1, 9, and 12. These guides are preferably made laterally adjustable, so that the reciprocating frame can be readily centered in the machine.

C, Fig. 8, is a transverse shaft journaled in a standard C', rising from the rear end of the main frame, and C² is a crank-disk secured to the inner end of said shaft.

c is a pitman, which connects the rear portion of the reciprocating frame B with the wrist-pin c' of the crank-disk C², as shown in Figs. 1 and 2, whereby said frame is actuated. The wrist-pin c' is preferably capable of radial adjustment on the crank-disk for lengthening or shortening the stroke of the reciprocating frame B. In the construction shown in the drawings, Figs. 1, 8, and 10, the wrist-pin is carried by an adjustable block $c^2$, which slides in an undercut groove $c^3$, formed diametrically in the face of the crank-disk, and this block is adjusted toward and from the axis of the disk by a rotary adjusting-screw $c^4$, held against endwise movement on the disk and engaging with a screw-theaded opening formed in the block $c^2$.

D, Fig. 8, is a transverse driving-shaft arranged below the shaft C and journaled in bearings on the rear portion of the main frame A and provided with a driving-pulley D'. The pulley D' is preferably loose on the shaft D and connected with the shaft by a clutch D² of any suitable or well-known construction. As shown in Fig. 1, the movable member of this clutch is carried by a bifurcated arm d, secured to a longitudinal rock-shaft d'. The latter is journaled in bearings secured to the side of the main frame A and is provided at its front end with a hand-lever $d^2$ for turning it. The upper shaft C is driven from the shaft D by a gear-wheel E and a pinion e, mounted on said shafts, respectively, as shown in Fig. 8.

F is an upright frame or grid-holder, which is mounted in the reciprocating frame B and which carries the lead battery plate or grid F'. The holder F is provided with an opening of the proper form to snugly receive the grid and with turn-buttons f or other suitable means for retaining the grid in the holder. The latter is longitudinally adjustable in the reciprocating frame, so that the same can be shifted to present different portions of the grid to the spinning mechanism. The adjusting device shown in the drawings consists of a longitudinal screw f', secured to the front end of the grid-holder F, and a rotary screw-nut $f^2$, engaging with said screw and provided with a hand-wheel $f^3$ for turning it. As shown in Fig. 13, this nut is held against endwise movement by an annular flange $f^4$, formed thereon and confined between the front end of the reciprocating frame B and a transverse ear or bracket $f^5$, secured to the front end of said frame and having an opening or bearing in which the cylindrical nut turns. Upon turning the hand-wheel $f^3$ in one or the other direction the grid-holder F is adjusted forward or backward in the reciprocating frame B. The adjusting-nut $f^2$ is locked in position by a vertically-swinging pawl $f^6$, having a tooth which engages with one of a series of notches $f^7$, formed in the edge of the nut-flange $f^4$, as shown in Fig. 14. This locking-pawl is pivoted to the bracket $f^5$.

g is a longitudinal gage-bar, which extends forwardly from the grid-holder and which passes loosely through a loop g', secured to the adjacent portion of the sliding frame B and having a pointer $g^2$, which is traversed by the graduated gage-bar. By the use of this bar the grid-holder can be readily adjusted to a predetermined position with reference to the stroke of the reciprocating frame.

H H are the spinning-rollers, which are arranged vertically on opposite sides of the reciprocating frame B and which consist of the usual sharp-edged disks mounted side by side on the shafts h h' of the rollers and the intervening washers $h^2$ for separating the disks. These rollers are movable toward and from each other and are carried by upright rock-shafts or horizontally-swinging frames I I', which are supported at their lower ends in step-bearings i, arranged on the main frame A and are journaled at their upper ends in bearings arranged in the yoke or top frame $A^2$, as shown in Figs. 4 and 15. The swinging frames I I' are provided at their upper and lower ends with inwardly-extending arms or bearings i', in which the upper and lower ends of the roller-shafts h h' are journaled. The lower bearings i' of the rollers are preferably formed integral with said frames, while their upper bearings are detachably secured thereto by bolts or other suitable means, as shown in Figs. 7 and 15. Each of the swinging frames I I' is operated by a horizontal toggle J, pivoted at its inner end to a forwardly-projecting arm j of the frame and at its outer end to a lug or block j', which projects from the inner side of the adjacent standard A' and which is preferably adjustable transversely of the machine. In the construction shown in the drawings, Fig. 2, each of these blocks is clamped in position by a longitudinal bolt $j^2$, which passes through a slot $j^3$, formed lengthwise in the block, and the latter is adjusted, after loosening said bolt, by means of a transverse bolt $j^4$, which bears against the rear end of the block.

k is a transverse rock-shaft arranged in rear of the standards A' and journaled in bearings on the main frame A, and k' are rods which connect the joints of the toggles J with arms $k^2$, extending upwardly from said rock-shaft, whereby said toggles are operated from said shaft and caused to move the spinning-rollers toward and from the grid between the same. The rock-shaft k is provided at one end with a pressure arm or lever $k^3$, which extends forwardly and rearwardly from said shaft and carries an adjustable weight L, which is adapted to depress one of the arms of said lever, so as to straighten the toggles J. As shown in Figs. 1, 2, 9, and 11, this weight is carried by a rod l, which is suspended from a longitudinal track or rail m, secured to the pressure-arm $k^3$ and extending in front and in rear of the rock-shaft $k$. The rod $l$ is preferably provided at its bifurcated upper end with an antifriction-roller $l'$, which runs upon said rail.

$n$ is a longitudinal adjusting-screw journaled in bearings $n'$, arranged on the pressure-lever $k^3$, but held against longitudinal movement in its bearings, and $n^2$ is a traveling non-rotary nut applied to the adjusting-screw $n$ and engaging with the bifurcated upper portion of the suspension-rod $l$, so that upon turning said screw in one or the other direction said rod and the weight mounted thereon are shifted toward or from the rock-shaft $k$, thereby forcing the spinning-rollers against the grid in the reciprocating frame B with a greater or less pressure, as required. The adjusting-screw $n$ is provided at its front end with a hand-wheel for turning it. The traveling nut $n^2$ is grooved on opposite sides to receive the jaws of the bifurcated suspension-rod $l$.

$n^3$ $n^4$ are stops, which are arranged on the frame of the machine above and below the pressure-lever $k^3$ and which prevent said lever from swinging beyond its normal limit in either direction.

A counterbalance-weight $o$ is preferably applied to the pressure-lever $k^3$ on the rear side of the rock-shaft $k$.

The spinning-rollers H are driven from a transverse shaft P, which is journaled in the main frame A below the rollers and which has a driving-pulley P'.

$q$ is a vertical shaft passing through the upright rock-shaft I and provided at its lower end with a bevel gear-wheel $q'$, which meshes with a similar gear-wheel $q^2$, secured to the driving-shaft P, as shown in Figs. 4 and 15. The spinning-roller carried by the rock-shaft or frame I is driven from the shaft $q$ by gear-wheels $q^3$ and $q^4$, secured to said shaft and the journal of said roller, as shown in Figs. 5 and 15. As shown in Figs. 4, 6, and 15, the other spinning-roller is also driven from the vertical shaft $q$ by a gear-wheel $r$, secured to the upper end of said shaft, and intermeshing idler-gears $r'$ $r^2$, one of which meshes with the gear-wheel $r$, secured to the upper end of the shaft $q$, and the other with a gear-wheel $r^3$, secured to the upper journal of said spinning-roller.

The operation of my improved machine is as follows: In the position of the parts shown in the drawings the lever $k^3$ is elevated and its weight L is located on the rear side of the transverse rock-shaft $k$, the toggles J are deflected rearwardly, the spinning-rollers H are withdrawn, and the reciprocating grid-carrying frame B is thrown out of gear with its driving-shaft. After placing a blank or grid in the holder F the reciprocating frame B and the spinning-rollers are set in motion. The rollers are caused to approach and penetrate the reciprocating grid by depressing the front arm of the pressure-lever $k^3$, which movement causes the toggles J to approach a straightened position and swing the vertical rock-frames I I' inwardly. The spinning-rollers are held to their work with a yielding pressure by shifting the weight L to the front side of the transverse rock-shaft $k$ by means of the adjusting-screw $n$, the pressure increasing as the weight is shifted away from the rock-shaft and diminishing as the same is shifted toward said shaft. As the spinning-rollers gradually penetrate the grid under the constant pressure of the weight L the toggles J are gradually straightened, and when they reach their straightened position the grid is grooved to the proper depth. After the toggles have been thus straightened in a forward direction the weight continues to turn the rock-shaft $k$ forwardly and causes the toggles to be deflected forwardly, as shown by dotted lines in Fig. 2, thereby withdrawing the spinning-rollers preparatory to spinning another section of the grid. The reciprocating frame B is now thrown out of gear with its driving-shaft by means of the clutch D², the grid-holder F is shifted to bring another portion of the grid opposite the spinning-rollers, and the reciprocating frame is again set in motion. The pressure-lever $k^3$ is now reversed to the position shown in Fig. 1 and its weight L shifted to the rear side of the transverse rock-shaft $k$ by the screw $n$, when the toggles J are gradually straightened in a rearward direction, causing the spinning-rollers to penetrate the grid, as before. When the toggles reach their straightened position, they are again deflected on the rear side of their pivots by the continued rearward turn of the rock-shaft $k$, thereby automatically withdrawing the spinning-rollers.

By the employment of the toggles J the spinning-rollers are automatically withdrawn when they have penetrated the grid to the desired depth, and the different sections of the grid are therefore spun uniformly and there is no possibility of the spinning-disks cutting entirely through the grid unless the machine is adjusted to permit this. The depth to which the spinning-rollers are allowed to penetrate the grid and the consequent height of the ribs is conveniently regulated by adjusting the outer pivots of the toggles toward and from the reciprocating frame B by means of the adjustable blocks $j'$. By providing the weight L with the adjusting-screw $n$, as shown, its movement along the lever $k^3$ is comparatively slow, and the operator cannot, therefore, force the spinning-rollers against the grid suddenly and injure the cutting-disks.

The stroke of the reciprocating frame B is regulated to suit the desired width of the spun sections of the grid by adjusting the wrist-pin of the crank-disk C² toward and from the axis of the disk, as hereinbefore described.

By supporting the grid vertically or on edge in the machine the same cannot sag or otherwise change its form while under the action of the spinning-rollers, and the ribs are therefore spun uniformly throughout their length on the different portions of the grid. By holding the grid in an upright position the further advantage is obtained that a more thorough lubrication of the grid is effected, the lubricant being delivered upon the upper end of the grid and flowing down both sides of the same.

By driving the reciprocating frame B and the spinning-rollers H from separate shafts said frame can be stopped for shifting the grid therein without requiring the spinning-rollers to be stopped.

I claim as my invention—

1. In a machine for making battery-grids, the combination with a pair of upright spinning-rollers, of an upright support for the blank or battery-plate arranged to move back and forth between said rollers, substantially as set forth.

2. The combination with a pair of upright horizontally-swinging frames, of upright spinning-rollers journaled in said frames, means for moving said frames toward and from each other, and an upright support for the blank or battery-plate arranged to reciprocate between said rollers, substantially as set forth.

3. In a machine for making battery-grids, the combination with a pair of frames which are movable toward and from each other, of spinning-rollers journaled in said frames, toggles which connect said frames with a stationary part of the machine, and means for actuating said toggles, substantially as set forth.

4. The combination with a pair of horizontally-swinging frames and upright spinning-rollers journaled therein, of horizontal toggles connecting said frames with a stationary part of the machine, means for straightening and deflecting said toggles, and a support for a blank arranged to reciprocate between said rollers, substantially as set forth.

5. The combination with a pair of horizontally-swinging frames and upright spinning-rollers journaled therein, of horizontal toggles connecting said frames with a stationary part of the machine, a transverse rock-shaft having actuating-arms, and rods connecting said toggles with said actuating-arms, substantially as set forth.

6. The combination with a pair of horizontally-swinging frames and upright spinning-rollers journaled therein, of horizontal toggles connecting said frames with a stationary part of the machine, a transverse rock-shaft having actuating-arms, connections between said toggles and said actuating-arms, and a pressure device applied to said rock-shaft for holding the spinning-rollers to their work with a yielding pressure, substantially as set forth.

7. The combination with a pair of horizontally-swinging frames and upright spinning-rollers journaled therein, of horizontal toggles connecting said frames with a stationary part of the machine, a transverse rock-shaft having actuating-arms and a pressure arm or lever, connections between said toggles and said actuating-levers, and a movable weight mounted on said pressure-arm, substantially as set forth.

8. The combination with a pair of horizontally-swinging frames and upright spinning-rollers journaled therein, of horizontal toggles connecting said frames with a stationary part of the machine, a transverse rock-shaft having actuating-arms connected with said toggles and a pressure-lever which extends in front and in rear of said rock-shaft, a weight arranged to move lengthwise on said pressure-lever, and an adjusting device for shifting said weight on said lever, substantially as set forth.

9. The combination with a pair of horizontally-swinging frames and upright spinning-rollers journaled therein, of horizontal toggles connecting said frames with a stationary part of the machine, a transverse rock-shaft having a pressure-lever and actuating-arms connected with said toggles, a movable weight carried by said pressure-lever, and a longitudinal adjusting-screw for said weight mounted on said lever, substantially as set forth.

10. The combination with a pair of horizontally-swinging frames and upright spinning-rollers journaled therein, of horizontal toggles connecting said frames with a stationary part of the machine, a transverse rock-shaft having a pressure-lever and actuating-arms connected with said toggles, a movable weight carried by said pressure-lever, a rotary adjusting-screw mounted lengthwise on said lever and held against longitudinal movement thereon, and a shifting nut traversing said screw and connected with said weight, substantially as set forth.

11. In a machine for making battery-grids, the combination with the spinning-rollers and a frame or carrier arranged to reciprocate between said rollers, of a blank-holder capable of longitudinal adjustment in said carrier, substantially as set forth.

12. In a machine for making battery-grids, the combination with the spinning-rollers and a frame or carrier arranged to reciprocate between said rollers, of a blank-holder movable lengthwise in said carrier, and an adjusting-screw for shifting said holder in said carrier, substantially as set forth.

13. In a machine for making battery-grids, the combination with the spinning-rollers, of a frame or carrier arranged to reciprocate between said rollers and provided with a pointer, of a blank-holder capable of longitudinal adjustment in said carrier, a gage-bar secured to said holder and traversing said pointer, and means for adjusting the holder in said carrier, substantially as set forth.

14. The combination with a pair of movable frames and spinning-rollers journaled therein, of a rock-shaft, connections between said rock-shaft and said frames for moving the same toward each other, and a pressure device applied to said rock-shaft for holding the spinning-rollers to their work with a yielding pressure, substantially as set forth.

15. The combination with a pair of movable frames and spinning-rollers journaled therein, of toggles connecting said frames with a stationary part of the machine, a rock-shaft having actuating-arms, connections between said arms and said toggles, and a pressure device applied to said rock-shaft for holding the spinning-rollers to their work with a yielding pressure, substantially as set forth.

16. The combination with a movable frame and a spinning-roller journaled therein, of a pressure device, and mechanism connecting said movable frame and said pressure device whereby said spinning-roller is held with a pressure to its work and is automatically moved away from the work, substantially as set forth.

Witness my hand this 29th day of September, 1900.

WILLARD F. RICHARDS.

Witnesses:
JNO. J. BONNER,
CLAUDIA M. BENTLEY.